Figure 1:
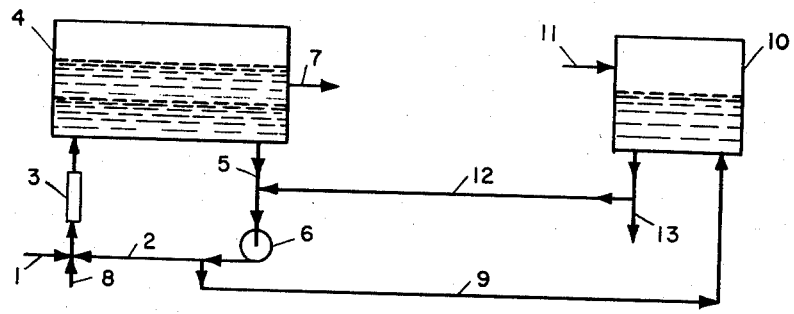

Sept. 6, 1960

M. D. COOKE 2,951,870

SEPARATION OF MINERAL ACID FROM MIXTURE
OF PHENOL AND ALIPHATIC KETONE

Filed April 9, 1957

MAURICE DUDLEY COOKE
INVENTOR.

BY Ernest G. Peterson
AGENT

United States Patent Office 2,951,870
Patented Sept. 6, 1960

2,951,870

SEPARATION OF MINERAL ACID FROM MIXTURE OF PHENOL AND ALIPHATIC KETONE

Maurice Dudley Cooke, Epsom, England, assignor, by mesne assignments, to Hercules Powder Company, a corporation of Delaware Filed Apr. 9, 1957, Ser. No. 651,619

Claims priority, application Great Britain Apr. 13, 1956

16 Claims. (Cl. 260—593)

The present invention refers to an improvement in the manufacture of phenols by the decomposition of α,α-dialkylarylmethyl hydroperoxides into phenols and aliphatic ketones by means of acidic catalysts and refers in particular to a process wherein mineral acids have been used as the decomposition catalyst.

The process of producing for instance phenol and acetone from isopropylbenzene hydroperoxide with the aid of mineral acids such as sulphuric acid, phosphoric acid and hydrochloric acid is already known. The use of sulphur dioxide has also been suggested. The reaction may be carried out in the homogeneous liquid phase, for instance using acetone as solvent, or in the heterogeneous phase. In the first case, a homogeneous reaction mixture results which will contain the acid catalyst and the various reaction products, and in the second case, a heterogeneous mixture is obtained, the upper layer comprising the organic reaction products whilst the lower layer contains the aqueous acid. On separating the two layers, it has been found that the organic layer has retained some of the mineral acid used as catalyst.

Before the products of the decomposition reaction are subjected to distillation in order to separate the phenol and ketone contained therein, it is necessary to remove the acid catalyst since its presence in the subsequent distillation will interfere with the efficient recovery of the products and by-products of the reaction. Removal of the acid catalyst is desirable also to prevent corrosion of the distillation equipment. This removal of the acid catalyst may be achieved by neutralization, and various basic substances have been suggested for this purpose such as aqueous alkali metal hydroxides, their carbonates and also sodium phenate. By reacting with the strong mineral acid used, the alkali metal salts of the acid are formed. In general, these salts are precipitated and their removal prior to the distillation is necessary, for instance by filtration. Since some of the salts may form a gelatinous deposit, this filtration has met with difficulties. Furthermore, in some cases, as for example when sodium phenate is used as neutralizing agent or with sodium hydroxide, where any excess will result in the formation of sodium phenate, any excess of this last compound is dissolved in the organic layer and may lead to a high ash content during the distillation and thus, in the course of time, to blockages of the stills. With sulphuric acid, which is the most frequently used catalyst in the decomposition, the addition of basic alkali metal compounds such as sodium hydroxide or carbonate leads to the formation of sodium sulphate which generally is deposited in a crystalline state so that its removal requires a separate step of filtration and this somewhat complicates the process, especially when carried out in a continuous manner.

It is an object of the present invention to remove the acid catalyst from the decomposition reaction mixture without the addition of neutralizing agents. It is a further object to avoid the formation of solid salts whereby a separate filtration step in the removal of the acid catalyst is dispensed with.

Accordingly the process of the present invention comprises contacting the reaction mixture, obtained by the decomposition of an α,α-dialkylaryl methyl hydroperoxide with a mineral acid catalyst, with an aqueous solution of a salt at a pH of not more than 7 in a concentration sufficient to ensure the formation of a separate aqueous phase, whereby the mineral acid catalyst is extracted from the organic phase into the aqueous phase.

It is an important feature of the process of the present invention that the mineral acid catalyst is extracted from the organic phase into a neutral or acid aqueous phase, and that no neutralizing agent is present, since in this way substantially no alkali is taken up as alkali phenate in the case of phenol-containing mixtures, by the organic phase. It is, in fact, most surprising that substantially all of the mineral acid catalyst is extracted from the organic phase into a neutral or acidic aqueous solution in this way.

By the term α,α-dialkylarylmethyl hydroperoxide is understood in this application a hydroperoxide or dihydroperoxide of the general formula

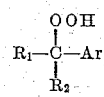

or

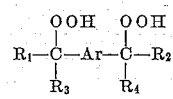

in which $R_1$, $R_2$, $R_3$ and $R_4$ represent alkyl groups, and Ar represents an aryl or alkaryl group with or without nuclear halogen substituents. As illustrative of these hydroperoxides may be mentioned cumene hydroperoxide, p-cymene hydroperoxide, sec-butylbenzene hydroperoxide, p-ethylisopropylbenzene hydroperoxide, isopropyl-naphthalene hydroperoxide, m-diisopropylbenzene dihydroperoxide, and p-diisopropylbenzene dihydroperoxide.

Any soluble salt may be used in aqueous solution at a pH of not more than 7 to extract the mineral acid according to the process of the present invention. As illustrative of such salts may be mentioned the alkali metal sulphates such as sodium and potassium sulphate; ammonium sulphate; the alkali metal chlorides, such as sodium and potassium chloride; ammonium chloride; and the alkali metal and ammonium phosphates and nitrates. It is, however, preferred to use the alkali metal or ammonium salts of the mineral acid catalyst. Thus when sulphuric acid has been the acid catalyst, the decomposition reaction mixture is advantageously treated with an aqueous alkali metal sulphate solution such as sodium sulphate solution. In the case of resorcinol-containing reaction mixtures it is preferred to use the ammonium salt, for instance ammonium sulphate where the mineral acid catalyst was sulphuric acid. The concentration of the aqueous salt solution must be such that after being contacted with the reaction mixture it separates readily therefrom and forms a separate layer, the lower aqueous layer containing virtually the whole of the mineral acid catalyst. The upper organic layer comprises large amounts of ketone and phenol and therefore the mixture is apt to dissolve considerable quantities of water from an aqueous salt solution of low concentration. A more concentrated salt solution offers the advantage that the separation of the mixture into two phases is favoured. The lower the concentration of the aqueous salt solution, the more phenol and ketone will dissolve therein, and these compounds may have to be recovered from the aqueous salt solution for efficient operation. The following table shows the amounts of acetone and phenol which dissolve in aqueous sodium sulphate solutions of various strengths in the removal of a sulphuric acid catalyst from a decomposition mixture which contains phenol, acetone, hydrocarbons and some by-products.

| $Na_2SO_4$, Percent | Phenol, Percent | Acetone |
|---|---|---|
| 5  | 1.5 | 10.5 |
| 10 | 0.8 | 8.7 |
| 15 | 0.5 | 7.0 |
| 20 | 0.3 | 5.5 |

From this it would appear that the use of the more highly concentrated solutions would be advantageous. However, if too highly concentrated solutions are used the salt may crystallize out from the solution and cause blockages in the plant. Crystallization may be prevented by operating at an increased temperature to take into account the crystallization temperature of the salt used. It is, therefore, advantageous to use a solution of fairly high concentration and adjust the temperature in such a manner that a crystallizing out of the salt does not occur. Owing to the big differences in solubility the optimum concentrations will vary widely with different salts. In general concentrations of from about 5% up to about 30 to 50% can be employed depending on the particular salt and the temperature in use. With sodium sulphate a concentration between about 5 and 30% by weight and preferably of about 20 to 25% by weight at about 40 to 45° C. is suitable for the removal of sulphuric acid. The volume of aqueous salt solution relative to the volume of the reaction mixture is not critical provided that mixing is thorough and that the volume of the aqueous salt solution is sufficient to prevent deposition of salt crystals due to take-up of water into the organic phase. It is however preferred to use a volume ratio of aqueous phase:organic phase of between 1 and 25:1, and preferably between 2 and 20:1.

The treatment of the decomposition reaction mixture with the salt solution may be carried out batchwise or in a continuous manner. Any method known for such extractions may be applied in the present case. For instance, both liquids may be passed conjointly through a tube under turbulent conditions whereby thorough mixing is effected. The mixture of the two liquids is then allowed to stand until separation into two layers has taken place. The upper organic layer which contains the phenol and ketone produced by the decomposition besides various by-products also formed is then practically completely free from the mineral acid and may then be introduced into the distillation equipment for the separation and recovery of the desired products.

In another method of carrying out the treatment, the organic mixture is introduced into a, preferably packed, column at the bottom whilst the aqueous salt solution enters the column at the top, thus effecting the extraction countercurrently.

The aqueous salt solution on being separated from the extracted organic phase is saturated with the phenol and the ketone and it is advantageous to use it for further extractions of acid from decomposition mixtures for instance by recirculating the solution in a continuous process. The concentration of the acid catalyst absorbed in the aqueous solution thereby increases and it has been found that up to a certain concentration the presence of acid in the extracting solution has no adverse effect upon the desired removal of the acid. The concentration of acid may be up to about 2% but preferably about 1% according to the conditions. To prevent undue accumulation of acid in the salt solution, some of the solution is withdrawn continuously or intermittently and is replaced by aqueous salt solution which contains less than the admissible maximum amount of acid. This can be achieved by partially or completely neutralizing the acid in the withdrawn portion and returning this to the system. Since this would otherwise increase the amount of salt in the salt solution it is necessary to bleed off an equivalent amount of salt solution at some point in the system. If desired this may then be extracted in the well-known manner to recover its content of phenol and ketone. In order to maintain the volume of the circulating salt solution and also its salt concentration at the desired level it is necessary to add water to the system, since the reaction mixture to be extracted absorbs water from the salt solution during the extraction even when the salt concentration in the extracting solution is high; this tends to reduce the volume of the salt solution and to increase the salt concentration. Suitably, the salt solution is replenished with a mixture of fresh water and a wholly or partly neutralized portion of the withdrawn fraction of the salt solution. Alternatively, the concentration of the neutralizing agent used to correct excess acidity in the salt solution can be adjusted to give a sufficient intake of water at this point. In a continuous process it is necessary to use as the neutralizing agent a base which will be converted into the salt in use as the extractant. Thus, if a sodium sulphate solution is being used to extract a sulphuric acid catalyst, the withdrawn fraction of the circulating aqueous solution is neutralized with sodium hydroxide or sodium phenate; if ammonium sulphate is being used, the neutralizing agent is ammonia.

It has been observed that after the treatment in accordance with the invention of a reaction mixture derived from the acid decomposition of cumene hydroperoxide, the organic phase, freed from the mineral acid catalyst, may contain small amounts of organic acids, such as formic acid and acetic acid. These are advantageously removed by contacting the organic phase after treatment to remove the mineral acid with sodium carbonate, suitably in aqueous solution. In a preferred embodiment of the invention the organic phase, derived from the acid decomposition of cumene hydroperoxide, after being treated to remove the acid catalyst, is contacted with an aqueous solution of sodium carbonate in the presence of a soluble salt, such as sodium sulphate, the concentration of the aqueous solution being sufficient to ensure the rapid formation of a separate aqueous phase and a clear organic phase whereby the organic acids are removed from the organic phase.

The invention is further illustrated with reference to the accompanying drawings, which illustrate diagrammatically three embodiments of the process of the present invention.

In Figure 1 the acid reaction mixture from the cleavage stage enters the system by line 1 and meets the circulating aqueous salt solution in line 2. The two streams pass through the mixer 3 into the settling tank 4 where the two phases separate out. The lower aqueous phase containing the extracted mineral acid is withdrawn from the settling tank by line 5 and recirculated by means of pump 6. Provision may be made for maintaining the circulating salt solution at the desired temperature. The extracted organic phase, free from mineral acid is withdrawn from the settling tank by line 7. Water is continuously added to the system by line 8 to replace the water absorbed by the organic phase. Part of the circulating salt solution is continuously withdrawn from the system by line 9, for the correction of excess acidity and pumped to the neutralizing tank 10, where it meets the neutralizing agent entering by line 11. The amount of neutralizing agent added may be sufficient to neutralize the salt solution partially or completely, or the salt solution may be made slightly alkaline. The neutralized salt solution is returned to the extraction system by line 12. A bleed of salt solution equivalent to the salt formed in the neutralization step is removed by line 13.

Figure 2:
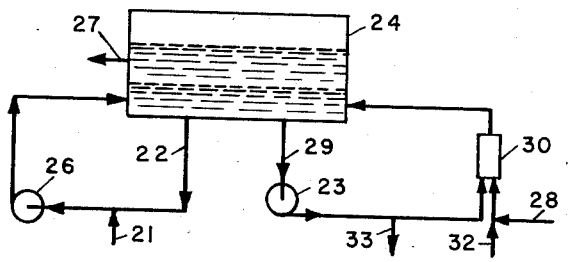

In Figure 2 the acid reaction mixture from the cleavage stage enters the system by line 21 and meets the circulating aqueous salt solution in line 22. The two streams are mixed in the pump 26 and passed into the settling tank 24 where the two phases separate out. The extracted organic phase free from mineral acid is withdrawn from the settling tank by line 27. The lower aqueous phase containing the extracted mineral acid is withdrawn from the settling tank by line 22 and recirculated by pump 26. A second circulating stream of aqueous salt solution is withdrawn from the settling tank by line 29, pumped by pump 23 to a mixer 30 where it is mixed with a stream of neutralizing agent entering by line 32, to correct excess acidity in the aqueous salt solution; and with a stream of water entering by line 28, and returned to the settling tank 24. A bleed of aqueous salt solution equivalent to the salt formed by the neutralization is withdrawn from the system by line 33.

Figure 3:
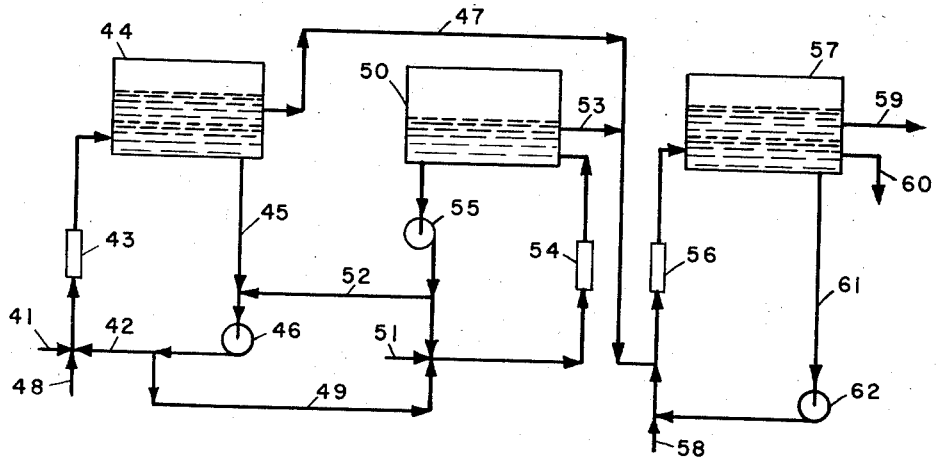

In the system illustrated in Figure 3, which is adapted for the removal of mineral acid from the reaction mixture resulting from the acid decompositon of cumene hydroperoxide, the acid reaction mixture from the cleavage stage enters by line 41 and meets the circulating aqueous sodium sulphate solution in line 42. The mixture passes through the mixer 43 into the settling tank 44 where the two phases separate out. The lower aqueous phase containing the extracted mineral acid is withdrawn from the settling tank by line 45 and recirculated by means of pump 46. Provision may be made for maintaining the circulating salt solution at the desired temperature. Water is continuously added to the system by line 48 to replace the water absorbed by the organic phase. Part of the circulating salt solution is continuously withdrawn by line 49 for the correction of excess acidity and pumped to the neutralizing system where it meets the neutralizing agent, sodium hydroxide or sodium phenate, entering at line 51. The mixture passes through the mixer 54 into the neutralizing tank 50. The neutralized salt solution is recirculated by pump 55. Salt solution is returned from the neutralizing system to the extracting system by line 52. A bleed of salt solution equivalent to the salt formed in the neutralization step is removed by line 53.

The extracted organic phase, free from mineral acid, is withdrawn from the settling tank 44 by line 47, meets the excess salt solution in line 53 from the neutralizing tank 50, and is passed through the mixer 56 into a second settling tank 57 for the removal of organic acids. Aqueous sodium carbonate enters by line 58. The lower aqueous phase is withdrawn from the settling tank by line 61 and resirculated by pump 62. The completely neutralized organic phase is withdrawn by line 59, and excess salt solution is removed by line 60.

The following examples are given further to illustrate the process of the invention. In the examples the parts by weight and parts by volume bear the same relation to each other as do kilograms to litres.

*Example 1*

A reaction mixture derived from the decomposition of m-diisopropylbenzene dihydroperoxide, having the following composition

| | Percent by weight |
|---|---|
| Acetone | 79.8 |
| Resorcinol | 9.5 |
| Water | 0.9 |
| Other organic compounds | 9.5 |
| Sulphuric acid | 0.32 | was treated for the removal of the sulphuric acid in the system illustrated in Figure 1.

The reaction mixture entered by line 1 at a rate of 10,000 parts by weight per hour and was met by about 23,500 parts by weight per hour of circulating aqueous ammonium sulphate solution maintained at a temperature above about 40° C. and of a concentration of about 32% by weight, in line 2. The mixture passed through an orifice mixer, 3 into the settling tank 4. The organic phase withdrawn by line 7 had the following composition.

| | Percent by weight |
|---|---|
| Acetone | 62.8 |
| Resorcinol | 7.5 |
| Water | 22.6 |
| Other organic compounds | 7.5 |
| Sulphuric acid | 0.024 |
| Ammonium sulphate | 0.055 |

Water was added by line 8 at a rate of about 2800 parts by weight per hour to replace the water absorbed by the organic phase.

A bleed from the circulating ammonium sulphate solution was taken by line 9 into the neutralizing tank 10 to which about 30 parts by weight per hour of 30% aqueous ammonia were continuously added, and neutralized salt solution was returned by line 12. An ultimate bleed of salt solution was withdrawn from line 13 at a rate of about 100 parts by weight per hour to maintain the ammonium sulphate concentration at the desired level.

*Example 2*

A cleavage reaction mixture derived from the decomposition of cumene hydroperoxide and containing 0.77% by weight of sulphuric acid was treated for the removal of the sulphuric acid in the system illustrated in Figure 2.

The reaction mixture entered by line 21 at an average rate of about 13.5 parts by weight per minute and was met by 300 parts by volume per minute of circulating aqueous sodium sulphate solution of a concentration which varied between 23.5 and 25% by weight in line 22. The mixture was thoroughly mixed by pump 26 and passed to the settling tank 24.

A second circulating stream of aqueous sodium sulphate solution was withdrawn from the settling tank by line 29 at a rate of 300 parts by volume per minute, mixed with aqueous sodium phenate entering by line 32 to correct excess acidity and with a stream of water entering by line 28, pumped through the mixing vessel 30 and returned to the settling tank 24. The sodium phenate feed was adjusted to maintain the pH of the aqueous salt solution between 5.0 and 7.0, and sufficient water was added by line 28 to maintain the concentration of the salt solution between 23.5 and 25%. A bleed of aqueous salt solution equivalent to the salt formed by the neutralization was withdrawn from the system by line 33. The temperature of the aqueous salt solution was maintained between 45° and 48° C. by means not shown in the diagram.

The extracted oil phase removed by line 27 contained less than 0.005% by weight of sulfuric acid.

*Example 3*

A reaction mixture derived from the decomposition of cumene hydroperoxide, having the following composition

| | Percent by weight |
|---|---|
| Acetone | 44.5 |
| Phenol | 34.6 |
| Water | 1.8 |
| Cumene | 8.2 |
| Other organic compounds | 10.7 |
| Sulphuric acid | 0.22 | was treated for the removal of the sulphuric acid in the system illustrated in Figure 3.

The reaction mixture entered by line 41 at a rate of about 10,000 parts by weight per hour and was met with about 26,000 parts by weight per hour of circulating sodium sulphate solution maintained at a temperature above about 40° C. and of a concentration of about 21% by weight in line 42. The mixture passed through an orifice mixer 43 into the settling tank 44. The organic phase withdrawn by line 47 at a rate of about 11,200 parts by weight per hour had the following composition.

| | Percent by weight |
|---|---|
| Acetone | 39.6 |
| Phenol | 32.7 |
| Water | 11.1 |
| Cumene | 8.0 |
| Other organic compounds | 9.6 |
| Sulphuric acid | 0 |

Water was added by line 48 at a rate of about 1000 parts by weight per hour to replace the water absorbed by the organic phase.

A bleed from the circulating sodium sulphate solution was taken by line 49 into the neutralizing system for the correction of excess acidity where it was mixed with 20% aqueous sodium phenate entering line 51 at a rate of about 232 parts by weight per hour. Neutralized salt solution was returned by line 52. An ultimate bleed of sodium sulphate solution was withdrawn by line 53 at a rate of about 255 parts by weight per hour mixed with the extracted organic phase, and passed through the orifice mixer 56 to the settling tank 57. Aqueous sodium carbonate solution of a concentration of about 5% was fed in by line 58 at a rate of about 80 parts by weight per hour. The organic phase, withdrawn from the settling tank 57 by line 59, contained no traces of organic acids.

I claim:

1. The process which comprises contacting the reaction mixture, obtained by decomposition of an $\alpha,\alpha$-dialkylarylmethyl hydroperoxide with a mineral acid catalyst and containing a phenol and an aliphatic ketone, with an aqueous solution of a salt selected from the group consisting of the alkali metal and ammonium salts of mineral acids at a pH of not more than 7 in a concentration sufficient to ensure the formation of a separate aqueous phase, said concentration being between about 10 and about 50% by weight, whereby the mineral acid catalyst is extracted from the organic phase into the aqueous phase, and separating the organic phase containing substantially all of the phenol and aliphatic ketone from the aqueous phase containing substantially all of the mineral acid catalyst.

2. The process as claimed in claim 1 wherein the reaction mixture is intimately mixed with the aqueous salt solution and the mixture is then allowed to stand to allow the two phases to separate.

3. The process as claimed in claim 1 wherein the salt is selected from the group consisting of the sulphates of the alkali metals and of ammonia.

4. The process as claimed in claim 1 wherein a salt of the mineral acid catalyst is used.

5. The process as claimed in claim 1 wherein the volume ratio of the aqueous salt solution to the reaction mixture is at least 1:1.

6. The process as claimed in claim 1 wherein the mineral acid catalyst is sulphuric acid and the salt is sodium sulphate.

7. The process as claimed in claim 6 wherein the aqueous sodium sulphate solution has a concentration between 10 and 30% by weight.

8. The process as claimed in claim 6 wherein the hydroperoxide is cumene hydroperoxide.

9. The process as claimed in claim 6 wherein the aqueous sodium sulphate solution has a concentration of about 20-25% and is maintained at a temperature of about 40-45° C.

10. The process as claimed in claim 6 wherein the organic phase is subsequently contacted with an aqueous sodium carbonate solution.

11. The process as claimed in claim 10 wherein the organic phase is contacted with an aqueous solution of sodium carbonate and sodium sulphate.

12. The process as claimed in claim 1 wherein the mineral acid catalyst is sulphuric acid and the salt is ammonium sulphate.

13. The process as claimed in claim 12 wherein the hydroperoxide is selected from the group consisting of meta- and para-diisopropylbenzene dihydroperoxides.

14. The process as claimed in claim 1 wherein the aqueous phase is used for extracting fresh reaction mixture.

15. The process as claimed in claim 14 wherein the aqueous phase is at least partially neutralized before being contacted with fresh reaction mixture.

16. The process as claimed in claim 15 wherein the salt formed by the neutralization is the same as the salt in the extracting solution.

References Cited in the file of this patent

UNITED STATES PATENTS

| 2,734,085 | Adams et al. | Feb. 7, 1956 |
| 2,737,480 | Adams et al. | Mar. 6, 1956 |
| 2,750,424 | Armstrong et al. | June 12, 1956 |